(12) United States Patent
Liao et al.

(10) Patent No.: US 11,518,150 B2
(45) Date of Patent: Dec. 6, 2022

(54) RELEASE LINER AND METHOD FOR PRODUCING THE SAME

(71) Applicant: NAN YA PLASTICS CORPORATION, Taipei (TW)

(72) Inventors: Te-Chao Liao, Taipei (TW); Chun-Che Tsao, Taipei (TW); Cheng-Hung Chen, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 261 days.

(21) Appl. No.: 17/022,261

(22) Filed: Sep. 16, 2020

(65) Prior Publication Data
US 2021/0245479 A1    Aug. 12, 2021

(30) Foreign Application Priority Data
Feb. 7, 2020  (TW) .................. 109103882

(51) Int. Cl.
*B32B 27/08*  (2006.01)
*B32B 27/36*  (2006.01)
(Continued)

(52) U.S. Cl.
CPC .............. *B32B 27/08* (2013.01); *B29C 48/18* (2019.02); *B32B 7/06* (2013.01); *B32B 7/12* (2013.01); *B32B 27/32* (2013.01); *B32B 27/36* (2013.01); *B32B 27/40* (2013.01); *C08J 3/22* (2013.01); *B32B 2250/03* (2013.01); *B32B 2250/24* (2013.01); *B32B 2250/40* (2013.01); *B32B 2255/26* (2013.01); *B32B 2264/0221* (2013.01); *B32B 2264/0278* (2013.01); *B32B 2264/0292* (2013.01); *B32B 2307/306* (2013.01); *B32B 2307/518* (2013.01); *B32B 2307/538* (2013.01);
(Continued)

(58) Field of Classification Search
CPC . B32B 27/08; B32B 2375/00; B32B 2367/00; B32B 2323/10; B32B 2323/04; B32B 2307/748; B32B 2307/732; B32B 2307/538; B32B 2307/306; B32B 2264/0292; B32B 2264/0278; B32B 2264/0221; B32B 255/26; B32B 2250/40; B32B 2250/24; B32B 2250/03; B32B 27/40; B32B 27/36; B32B 27/32; B32B 7/12; B32B 7/06; C08J 3/22; B29C 48/18
See application file for complete search history.

(56) References Cited

FOREIGN PATENT DOCUMENTS

| CN | 202671962 U | 1/2013 |
| CN | 103061207 A | 4/2013 |
| EP | 2033770 B1 | 6/2012 |

*Primary Examiner* — Ellen S Hock
(74) *Attorney, Agent, or Firm* — Li & Cai Intellectual Property (USA) Office

(57) ABSTRACT

A release liner and a method for producing the same are provided. The release liner includes a resin base layer and two resin release layers. The resin base layer has two surfaces opposite to each other. The two resin release layers are respectively formed on the two surfaces of the resin base layer. Each of the resin release layers includes: a non-polar resin material and a polar resin material. In each of the resin release layers, the polar resin material is dispersed in the non-polar resin material in a plurality of granular forms, an average particle size of the polar resin material ranges from 0.1 μm to 10 μm, and a content of the polar resin material in the resin release layer ranges from 10 wt % to 50 wt %, so that a surface roughness (Ra) of the resin release layer ranges from 0.1 μm to 10 μm.

6 Claims, 4 Drawing Sheets

(51) Int. Cl.
  *B32B 27/40* (2006.01)
  *B32B 7/12* (2006.01)
  *C08J 3/22* (2006.01)
  *B32B 7/06* (2019.01)
  *B29C 48/18* (2019.01)
  *B32B 27/32* (2006.01)
(52) U.S. Cl.
  CPC ... *B32B 2307/732* (2013.01); *B32B 2307/748* (2013.01); *B32B 2323/04* (2013.01); *B32B 2323/10* (2013.01); *B32B 2367/00* (2013.01); *B32B 2375/00* (2013.01)

RELEASE LINER AND METHOD FOR PRODUCING THE SAME

CROSS-REFERENCE TO RELATED PATENT APPLICATION

This application claims the benefit of priority to Taiwan Patent Application No. 109103882, filed on Feb. 7, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a release liner and a method for producing the same, and more particularly to a release liner and a method for producing the same, which is capable of providing a thermoplastic polyurethane (TPU) material to be coated on the release liner, or providing a polyurethane (PU) material to be coated on the release liner.

BACKGROUND OF THE DISCLOSURE

A conventional release liner is capable of providing a thermoplastic polyurethane (TPU) material to be coated thereon, or providing a polyurethane (PU) material to be coated thereon.

In the related art, a high-strength plasma surface treatment or a solvent coating treatment is generally performed on a surface of a release liner to change a surface microstructure of the release liner, so that an adhesive strength between the TPU coating layer or the PU coating layer and the release liner can be improved.

However, after the release liner undergoes the above-mentioned treatments, an adhesive strength between the TPU coating layer or the PU coating layer and the release liner is usually too high, resulting in poor release effect. Moreover, due to the excessively high adhesive strength, after the TPU coating layer or the PU coating layer is separated from the release liner, a part of the release liner is prone to interlayer peeling, and therefore the release liner in the related art cannot have both a good release effect and a good adhesive strength.

SUMMARY OF THE DISCLOSURE

In response to the above-referenced technical inadequacies, the present disclosure provides a release liner and a method for producing the same.

In one aspect, the present disclosure provides a release liner which includes a resin base layer and two resin release layers. The resin base layer has two surfaces opposite to each other. The two resin release layers are respectively formed on the two surfaces of the resin base layer. Each of the resin release layers includes: a non-polar resin material and a polar resin material. In each of the resin release layers, the polar resin material is dispersed in the non-polar resin material in a plurality of granular forms, an average particle size of the polar resin material ranges from 0.1 μm to 10 μm, and a content range of the polar resin material in the resin release layer ranges from 10 wt % to 50 wt %, so that a surface roughness (Ra) of the resin release layer ranges from 0.1 μm to 10 μm.

In another aspect, the present disclosure provides a method for producing a release liner, which includes: implementing a masterbatch preparation step, including: using a twin-screw granulator to melt and knead a non-polar resin material and a polar resin material, and then form a plurality of release resin masterbatches; implementing a film forming step, including: co-extruding the plurality of release resin masterbatches and a resin base material through a co-extrusion technology to form two resin release layers and a resin base layer at the same time. The resin base layer is formed by the resin base material, and the two resin release layers are respectively formed by the plurality of the release resin masterbatches. The resin base layer has two surfaces opposite to each other, the two resin release layers are respectively formed on the two surfaces of the resin base layer. In each of the resin release layers, the polar resin material is dispersed in the non-polar resin material in a plurality of granular forms, an average particle size of the polar resin material ranges from 0.1 μm to 10 μm, and a content range of the polar resin material in the resin release layer ranges from 10 wt % to 50 wt %, so that a surface roughness (Ra) of the resin release layer ranges from 0.1 μm to 10 μm.

Therefore, the release liner of the present disclosure and the method for producing the same enable the release liner to have good release effect and adhesive strength while maintaining good heat resistance and thermal stability by virtue of "each of the resin release layers including a non-polar resin material and a polar resin material" and "in each of the resin release layers, the polar resin material being dispersed in the non-polar resin material in a plurality of granular forms, an average particle size of the polar resin material ranging from 0.1 μm to 10 μm, and a content range of the polar resin material in the resin release layer ranging from 10 wt % to 50 wt %, so that a surface roughness (Ra) of the resin release layer ranging from 0.1 μm to 10 μm". Therefore, the defects of the release liner in the prior art can be improved.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
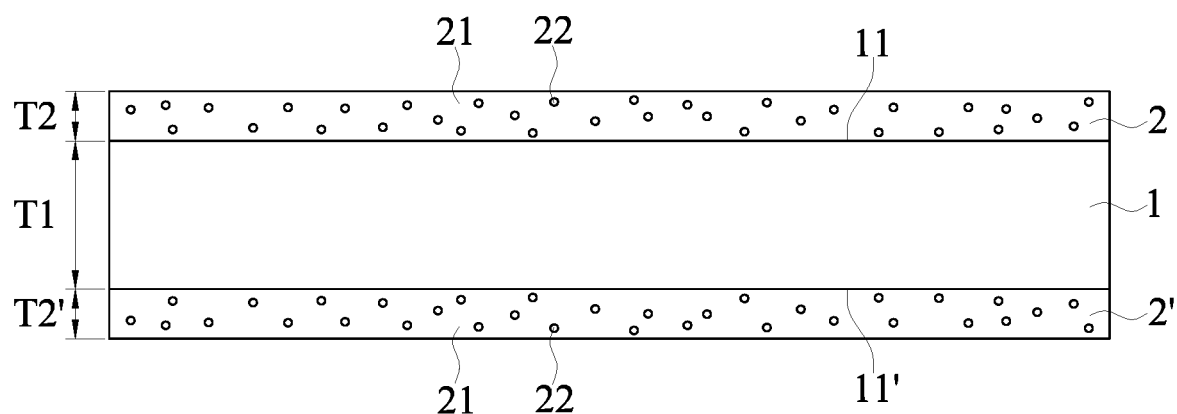
FIG. 1 is a schematic diagram of a release liner according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Release Liner

Referring to FIG. 1, an embodiment of the present disclosure provides a release liner 100. The release liner 100 includes a resin base layer 1 and two resin release layers 2, 2'. The release liner 100 is formed by co-extruding the resin base layer 1 and the two resin release layers 2, 2' through a co-extrusion technology, but the present disclosure is not limited thereto.

Figure 2:
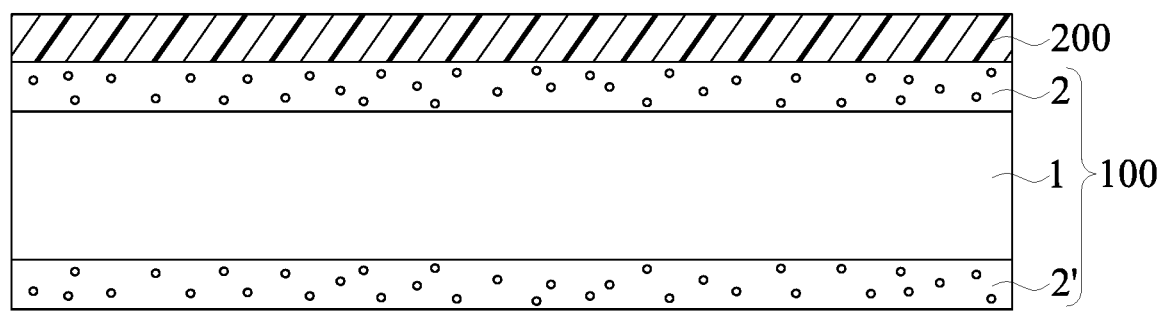
FIG. 2 is a schematic diagram of a separable adhesive layer formed on the release liner of FIG. 1.
Figure 3:
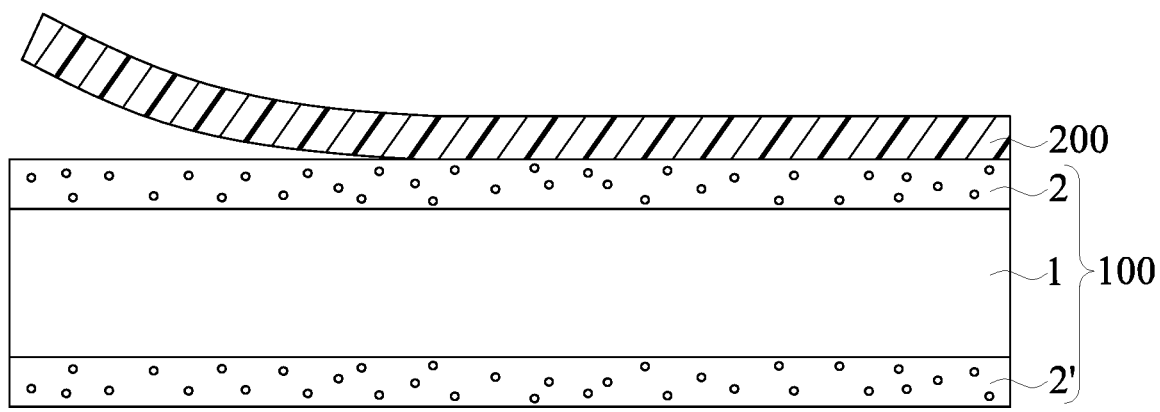
FIG. 3 is a schematic diagram of part of the release liner and the separable adhesive layer of FIG. 2 being peeled off.

The release liner 100 is capable of providing a thermoplastic polyurethane (TPU) material to be coated thereon, or providing a polyurethane (PU) material to be coated thereon, so as to form a separable adhesive layer 200 on the release liner 100 as shown in FIG. 2 and FIG. 3. In other words, the release liner 100 is a release liner 100 that can be used in a thermoplastic polyurethane coating process or a polyurethane coating process.

The main material of the release liner 100 of the present embodiment is polyethylene (PE) or polypropylene (PP), and the release liner 100 is mixed with other organic resin materials, such as polyester (PET), polyurethane (PU), or thermoplastic polyurethane (TPU).

An objective of the present disclosure is that the release liner 100 has good release effect and adhesive strength while maintaining good heat resistance and thermal stability.

In order to achieve the above objective, a technical solution provided in the present embodiment is mainly to control an average particle size and a content range of the organic resin material in the release liner 100, so that the release liner 100 can achieve a desired surface roughness (Ra), which has both good release effect and adhesive strength while maintaining good heat resistance and thermal stability. Furthermore, after the release liner 100 is separated from the separable adhesive layer 200, no interlayer peeling occurs in the release liner 100.

More specifically, further referring to FIG. 1, the resin base layer 1 has two surfaces 11, 11' opposite to each other. The material of the resin base layer 1 is at least one material selected from the group consisting of polyethylene (PE) and polypropylene (PP). In addition, the resin base layer 1 has a thickness T1 between 50 µm and 300 µm, thereby providing good support for the two resin release layers 2, 2'.

It should be noted that if the thickness T1 of the resin base layer 1 is greater than an upper limit of the above-mentioned thickness range, a bendability of the release liner 100 will be deteriorated, so that the liner is not suitable to be used as a release liner. On the contrary, if the thickness T1 of the resin base layer 1 is less than a lower limit of the above-mentioned thickness range, a structural strength of the release liner 100 is insufficient, which cannot provide good support for the two resin release layers 2, 2', so that the liner is not suitable to be used as a release liner.

Further, please continue to refer to FIG. 1, in the release liner 100, the two resin release layers 2, 2' are respectively formed on the two surfaces 11, 11' of the resin base layer 1. That is, the release liner 100 is a three-layer structure formed by sandwiching the resin base layer 1 by the two resin release layers 2, 2'.

In the present embodiment, each of the resin release layers 2, 2' includes: a non-polar resin material 21 and a polar resin material 22. In each of the resin release layers 2, 2', the polar resin material 22 is dispersed in the non-polar resin material 21 in a plurality of granular forms. In terms of an average particle size of the polar resin material 22, the average particle size of the polar resin material 22 is preferably between 0.1 µm and 10 µm, and more preferably between 1 µm and 5 µm. In terms of a content range of the polar resin material 22, the content range of the polar resin material 22 in the resin release layer 2 or 2' is preferably between 10 wt % and 50 wt %, and more preferably between 15 wt % and 30 wt %.

According to the configuration of the average particle size and the content range of the polar resin material 22, an outer surface of the resin release layers 2, 2' (i.e., a surface of the resin release layer 2, 2' away from the resin base layer 1) can achieve a desired surface roughness, so that the release liner 100 can have both good release effect and adhesive strength while maintaining good heat resistance and thermal stability. More specifically, the surface roughness (Ra) of the outer surface of the resin release layers 2, 2' is preferably between 0.1 µm and 10 µm, and more preferably between 5 µm and 10 µm.

It is worth mentioning that the polar resin material 22 is a hydrophilic material, the surface of the polar resin material 22 has high hydrophilicity, the non-polar resin material 21 is a hydrophobic material, and the surface of the non-polar resin material 21 has low hydrophilicity. Therefore, the polar resin material 22 and the non-polar resin material 21 are incompatible with each other.

According to the incompatibility between the above two resin materials, the technical solution provided by the present embodiment is to mix the polar resin material 22 with the non-polar resin material 21 under the above-mentioned specific average particle size and content range, so that the outer surface of the resin release layers 2, 2' can achieve the desired surface roughness, and the polar resin material 22 can be uniformly dispersed in the non-polar resin material 21 in a plurality of granular forms. In other words, the polar resin material 22 and the non-polar resin material 21 still have a certain degree of compatibility under the above-mentioned specific average particle size and content range.

It should be noted that if the average particle size and the content range of the polar resin material 22 are greater than a upper limit of the above range (i.e., the average particle size being greater than 10 μm, and the content range being greater than 50 wt %), the compatibility between the polar resin material 22 and the non-polar resin material 21 will be significantly deteriorated, the polar resin material 22 will not be uniformly dispersed in the non-polar resin material 21, and the resin release layer 2, 2' will generate a lot of bubbles, so that the release liner 100 has a poor appearance, thereby reducing a yield rate of a final product. Conversely, if the average particle size and the content range of the polar resin material 22 are less than a lower limit of the above range (i.e., the average particle size being less than 0.1 μm, and the content range being less than 10 wt %), the polar resin material 22 will not have a significant effect in the resin release layer 2, 2', so that the release liner 100 cannot have good release effect and adhesive strength.

Furthermore, in order to enable the above two mutually incompatible resin materials to be uniformly mixed with each other, in an embodiment of the present disclosure, a weight ratio range of the non-polar resin material 21 and the polar resin material 22 is preferably between 10:1 and 2:1, and more preferably between 8:1 and 4:1.

In terms of material types, in each of the resin release layers 2, 2', the non-polar resin material 21 is at least one material selected from the group consisting of polyethylene and polypropylene, and the polar resin material 22 is at least one material selected from the group consisting of polyester (PET), polyurethane (PU), and thermoplastic polyurethane (TPU).

According to the selection of the above material types, the base material of the resin release layer 2, 2' of the present embodiment is at least one of polyethylene and polypropylene, which has the same or similar properties (i.e., polarity or hydrophobicity) as that of the resin base layer 1. Therefore, the two resin release layers 2, 2' and the resin base layer 1 can have good adherence and adhesion, so that interlayer peeling is not easy to occur between the interlayers of the release liner 100.

In addition, the resin release layer 2, 2' is mixed with at least one of polyester (PET), polyurethane (PU), and thermoplastic polyurethane (TPU), which has the same or similar properties (i.e., polarity or hydrophobicity) as that of the separable adhesive layer 200 (i.e., polyurethane, thermoplastic polyurethane) subsequently formed thereon. Therefore, after the separable adhesive layer 200 is formed on the release liner 100, the release liner 100 and the separable adhesive layer 200 have good adhesive strength therebetween. In addition, since the surface of the release liner 100 has the afore-mentioned specific surface roughness (Ra), the release liner 100 and the separable adhesive layer 200 also have good release effect.

In an embodiment of the present disclosure, the non-polar resin material 21 and the polar resin material 22 each have specific hydrophilic and hydrophobic properties. Specifically, in each of the resin release layers 2, 2', a surface of the non-polar resin material 21 has a first dyne value (i.e., first dyne level), and a surface of the polar resin material 22 has a second dyne value (i.e., second dyne level). The first dyne value is not greater than 31, the second dyne value is not less than 31, and an absolute value of a difference between the first dyne value and the second dyne value is not less than 4 Accordingly, the outer surface of the resin release layers 2, 2' can reach the desired surface roughness.

In an embodiment of the present disclosure, the three-layer structure of the release liner 100 has a preferable thickness ratio. Specifically, each of the resin release layers 2, 2' has a thickness T2, T2' between 1 micrometer and 50 micrometers. The thickness ratio of one of the resin release layers 2, the resin base layer 1, and another one of the resin release layers 2' is preferably between 1:12:1 and 1:7:1, and more preferably between 1:10:1 and 1:8:1. Accordingly, the release liner 100 can achieve desired physical and chemical properties.

It should be noted that if the thickness of each of the resin release layers 2, 2' exceeds an upper limit or a lower limit of the above-mentioned thickness range, the release liner 100 does not achieve the desired physical and chemical properties, such as release effect or adhesive strength.

According to the above configuration, since the release liner 100 of the present embodiment has good release effect and adhesive strength while maintaining good heat resistance and thermal stability, the release liner 100 is capable of providing a thermoplastic polyurethane (TPU) material to be coated thereon, or providing a polyurethane (PU) material to be coated thereon, so as to form a separable adhesive layer 200 on the release liner 100 as shown in FIG. 2 and FIG. 3. Further, an adhesive strength between the release liner 100 and the separable adhesive layer 200 obtained by conducting a tensile test with a 90-degree tensile testing machine is preferably between 20 N/cm and 80 N/cm, and more preferably between 40 N/cm and 60 N/cm. That is, the separable adhesive layer 200 and the release liner 100 have a certain degree of adhesive strength there between, but the release effect of the release liner 100 is not affected by an excessively high adhesive strength.

Moreover, since the release liner 100 will be exposed to a high temperature environment in a thermoplastic polyurethane (TPU) coating process or a polyurethane (PU) coating process, the release liner 100 must have good heat resistance and thermal stability. According to the above technical solution of the present embodiment, the release liner 100 has a heat-resistant temperature preferably not less than 180° C., and more preferably not less than 200° C. It should be noted that the method of measuring the heat-resistant temperature may be, for example, placing the release liner 100 in an oven with a specific temperature (i.e., 180° C.); and then observing whether or not the release liner 100 is deformed significantly after a period of time (i.e., 5 minutes), so that the heat-resistant temperature of the release liner 100 can be obtained.

Further, since in the present embodiment, the two resin release layers 2, 2' and the resin base layer 1 have good adherence and adhesion therebetween, so that interlayer peeling is not easy to occur between the interlayers of the release liner 100. Specifically, in an embodiment of the present disclosure, after the release liner 100 passes the above tensile test, no interlayer peeling occurs between the two resin release layers 2, 2' and the resin base layer 1. It should be noted that an evaluation method of interlayer peeling may be, for example, slicing the release liner 100 that has undergone a tensile test, and observing a scanning electron microscope (SEM) photo of the sliced release liner 100, so that whether or not interlayer peeling occurs between the layers of the release liner 100 can be observed. For example, if a gap greater than 5 micrometers is generated between the layers of the release liner 100, the release liner 100 is evaluated that interlayer peeling has occurred, otherwise, the release liner 100 is evaluated that no interlayer peeling has occurred.

It is worth mentioning that, in the prior art, a high-strength plasma surface treatment or a solvent coating treatment is generally performed on a surface of a release liner to change a surface microstructure of the release liner, so that an adhesive strength between the TPU coating layer or the PU coating layer and the release liner can be improved. However, after the release liner undergoes the above-mentioned treatments, an adhesive strength between the TPU coating layer or the PU coating layer and the release liner is usually too high, resulting in poor release effect. Moreover, due to the excessively high adhesive strength, after the TPU coating layer or the PU coating layer is separated from the release liner, a part of the release liner is prone to interlayer peeling, and therefore the release liner in the prior art cannot have both good release effect and adhesive strength.

Compared with the release liner in the prior art, the release liner 100 of the present embodiment can have good release effect and adhesive strength while maintaining good heat resistance and thermal stability without requiring high-strength plasma surface treatment or solvent coating treatment by virtue of the above technical solutions (i.e., controlling the average particle size and the content range of the organic resin material in the release liner 100), thereby improving the defects of the release liner in the prior art.

Method for Producing Release Liner

The above is a relevant description of the structure and materials of the release liner 100 of the present embodiment, and a method for producing a release liner 100 will be described below according to an embodiment of the present disclosure.

Figure 4:
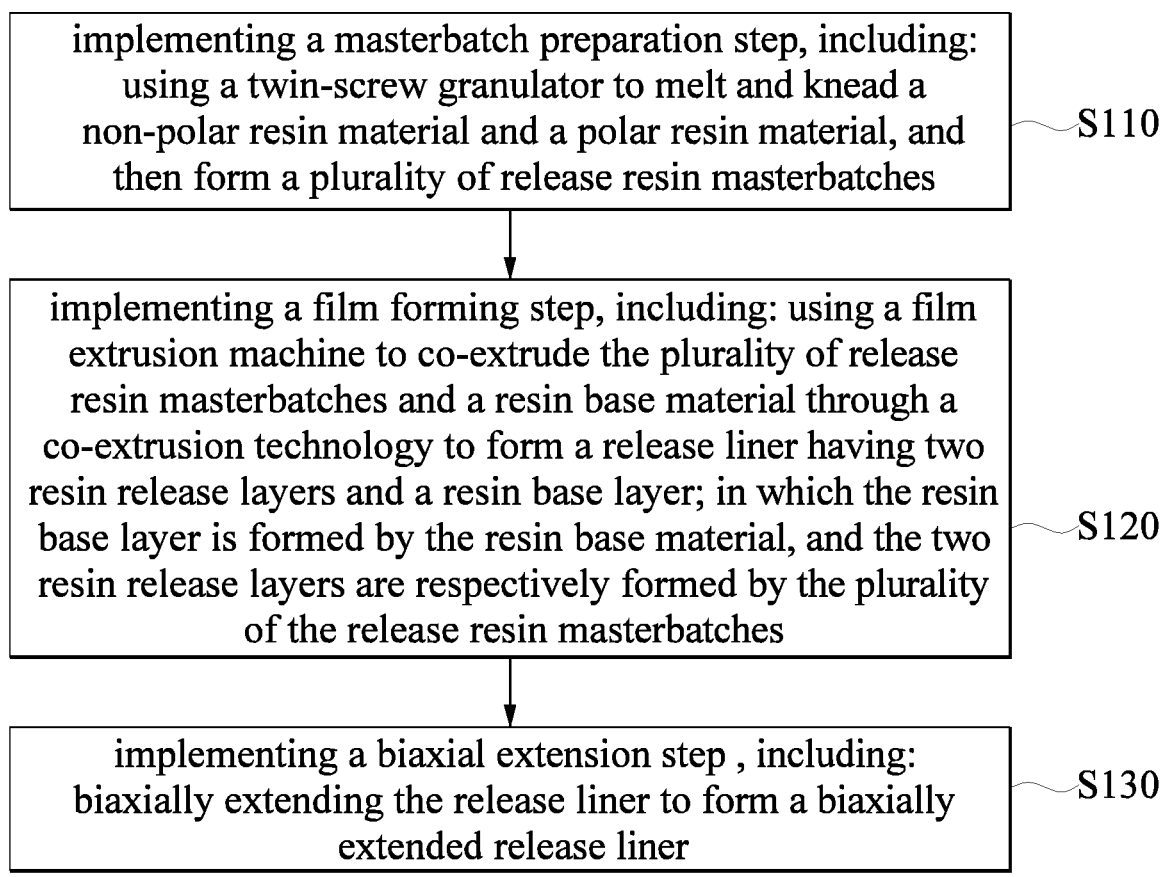
FIG. 4 is a flowchart of a method for producing a release liner according to an embodiment of the present disclosure.

As shown in FIG. 4, the present embodiment also discloses a method for producing a release liner 100. The method for producing the release liner 100 includes step S110, step S120, and step S130. It should be noted that the order of the steps and the actual operation ways described in the present embodiment can be adjusted according to requirements and are not limited to those described in the present embodiment.

The step S110 implements a masterbatch preparation step. The masterbatch preparation step includes using a twin-screw granulator to melt and knead a non-polar resin material 21 and a polar resin material 22, and then form a plurality of release resin masterbatches.

The step S120 implements a film forming step. The film forming step includes using a film extrusion machine to co-extrude the plurality of release resin masterbatches and a resin base material through a co-extrusion technology to form a release liner 100 having two resin release layers 2, 2' and a resin base layer 1. The resin base layer 1 is formed by the resin base material, and the two resin release layers 2, 2' are respectively formed by the plurality of the release resin masterbatches.

More specifically, the resin base layer 1 has two surfaces 11, 11' opposite to each other, and the two resin release layers 2, 2' are respectively formed on the two surfaces 11, 11' of the resin base layer 1. In each of the resin release layers 2, 2', the polar resin material 22 is dispersed in the non-polar resin material 21 in a plurality of granular forms, an average particle size of the polar resin material 22 ranges from 0.1 μm to 10 μm, and a content range of the polar resin material 22 in the resin release layer 2, 2' ranges from 10 wt % to 50 wt %, so that a surface roughness (Ra) of the resin release layer 2, 2' ranges from 0.1 μm to 10 μm.

The step S130 implements a biaxial extension step. The biaxial extension step includes biaxially extending the release liner 100 having the three-layer structure to form a biaxially extended release liner 100.

The above-mentioned biaxial extending method may be, for example, a longitudinal uniaxial extending method, a horizontal uniaxial extending method, a longitudinal axis stepwise biaxial extending method, or a longitudinal axis simultaneous biaxial extending method, and the present disclosure is not limited thereto. Furthermore, the above-mentioned biaxial extending method can be, for example, preheating the unstretched release liner 100 at an elongation temperature of 50° C. to 150° C., and the unstretched release liner 100 is subjected to different stretching ratios. The width direction (or transverse direction, TD) of the release liner 100 is stretched, and then the length direction (or longitudinal direction, MD) of the release liner 100 is further stretched.

Beneficial Effects

In conclusion, the release liner of the present disclosure and the method for producing the same enable the release liner to have good release effect and adhesive strength while maintaining good heat resistance and thermal stability by virtue of "each of the resin release layers including: a non-polar resin material and a polar resin material" and "in each of the resin release layers, the polar resin material being dispersed in the non-polar resin material in a plurality of granular forms, an average particle size of the polar resin material ranging from 0.1 μm to 10 μm, and a content range of the polar resin material in the resin release layer ranging from 10 wt % to 50 wt %, so that a surface roughness (Ra) of the resin release layer ranging from 0.1 μm to 10 μm". Therefore, the defects of the release liner in the prior art can be improved.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A release liner, comprising:
   a resin base layer having two surfaces opposite to each other; and
   two resin release layers being respectively formed on the two surfaces of the resin base layer; wherein each of the resin release layers includes: a non-polar resin material and a polar resin material; wherein in each of the resin release layers, the polar resin material is dispersed in the non-polar resin material in a plurality of granular forms, an average particle size of the polar resin material ranges from 0.1 μm to 10 μm, and a content range of the polar resin material in the resin release layer ranges from 10 wt % to 50 wt %, so that a surface roughness (Ra) of the resin release layer ranges from 0.1 μm to 10 μm.

2. The release liner according to claim 1, wherein a surface of the non-polar resin material has a first dyne value, and a surface of the polar resin material has a second dyne value; wherein the first dyne value is not greater than 31, the second dyne value is not less than 31, and an absolute value of a difference between the first dyne value and the second dyne value is not less than 4.

3. The release liner according to claim 1, wherein a material of the resin base layer is at least one of polyethylene (PE) and polypropylene (PP); wherein in each of the resin release layers, the non-polar resin material is at least one of polyethylene and polypropylene, and the polar resin material is at least one of polyester (PET), polyurethane (PU), and thermoplastic polyurethane (TPU).

4. The release liner according to claim 1, wherein the resin base layer has a thickness between 50 μm and 300 μm, and each of the resin release layers has a thickness between 1 μm and 50 μm; wherein a thickness ratio of one of the resin release layers, the resin base layer, and another one of the resin release layers is between 1:12:1 and 1:7:1.

5. The release liner according to claim 1, wherein the release liner is capable of having a thermoplastic polyurethane (TPU) material coated thereon, or having a polyurethane (PU) material coated thereon, so as to form a separable adhesive layer on the release liner; wherein an adhesive strength between the release liner and the separable adhesive layer obtained by a tensile test is between 20 N/cm and 80 N/cm.

6. The release liner according to claim 5, wherein the release liner has a heat-resistant temperature not less than 180° C., and after the release liner passes the tensile test, no interlayer peeling occurs between the two resin release layers and the resin base layer.

* * * * *